(12) United States Patent
Eromäki et al.

(10) Patent No.: US 7,197,346 B2
(45) Date of Patent: Mar. 27, 2007

(54) MOBILE ELECTRONIC DEVICE HAVING PIVOTABLE DISPLAY ELEMENT

(75) Inventors: Marko Eromäki, Tampere (FI); Esa Määttä, Tampere (FI)

(73) Assignee: Nokia Corporation, Espoo (FI)

( * ) Notice: Subject to any disclaimer, the term of this patent is extended or adjusted under 35 U.S.C. 154(b) by 484 days.

(21) Appl. No.: 10/395,016

(22) Filed: Mar. 21, 2003

(65) Prior Publication Data
US 2004/0058703 A1 Mar. 25, 2004

(30) Foreign Application Priority Data
Mar. 21, 2002 (WO) ........................ PCT/IB02/00833

(51) Int. Cl.
*H04M 1/00* (2006.01)
(52) U.S. Cl. ................... 455/575.8; 455/550.1
(58) Field of Classification Search ............. 455/550.1, 455/556.2, 566, 575.1, 575.3, 575.4, 575.8
See application file for complete search history.

(56) References Cited

U.S. PATENT DOCUMENTS 5,896,575 A * 4/1999 Higginbotham et al. .... 455/566
5,991,644 A * 11/1999 Ogawa ........................ 455/566
6,230,028 B1 * 5/2001 Shirakawa ................... 455/566
2002/0010007 A1 * 1/2002 Goodings et al. ........... 455/566
2003/0119543 A1 * 6/2003 Kfoury et al. .............. 455/550

FOREIGN PATENT DOCUMENTS

| EP | 1217501 | 6/2002 |
| JP | 1074118 | 3/1998 |
| WO | 9819434 | 5/1998 |
| WO | 9838822 | 9/1998 |
| WO | 0153919 | 7/2001 |
| WO | 0208876 | 1/2002 |

* cited by examiner

*Primary Examiner*—Duc M. Nguyen
*Assistant Examiner*—Michael Thier
(74) *Attorney, Agent, or Firm*—Ware, Fressola, Van Der Sluys & Adolphson LLP

(57) ABSTRACT

The invention presents a new way to implement a bigger keyboard in foldable mobile electronic devices terminal devices without increasing the size. The mobile terminal device is foldable, and can be arranged in a closed and in an open position, wherein in both positions a large display is at least partially visible and operable. A mobile terminal device according to the invention comprises a body, a display and at least one cover. The cover is movably attached to said body, and comprises a kinematic element to move or guide the display in a way that it is visible in the closed and in the open position.

20 Claims, 8 Drawing Sheets

MOBILE ELECTRONIC DEVICE HAVING PIVOTABLE DISPLAY ELEMENT

CROSS-REFERENCE TO RELATED APPLICATIONS

This application claims priority under 35 USC §119 to International Patent Application No. PCT/IB02/00833 filed on Mar. 21, 2002.

TECHNICAL FIELD

The present invention relates to foldable mobile electronic devices (MED). More particular the present invention relates to foldable communicator and personal digital assistant (PDA)-type of devices. More specifically the invention relates to the field of folding mechanisms for communicator and PDA-type of devices. In particular the present invention relates to a mobile electronic device having a pivotable display element.

BACKGROUND OF THE INVENTION

Because of integration, mobile devices, including mobile phones and other mobile terminal devices such as PDA's (personal digital assistants) and pocket computers, are getting smarter, smaller and offer more and more different functions. This leads to the requirement of more extended and versatile input devices such as keyboards. At the same time, however, the size of the mobile terminal devices has to remain the same or even get smaller. The need for relatively large keyboards for small mobile terminal devices is growing all the time when mobile terminal devices decrease in size. Existing solutions encompass foldable mobile terminal devices, or if more applications are needed, solutions such as the Nokia Communicator.

The problems with current NOKIA® Communicators (9000, 9110, 9210, . . . ) is that the clamshell concept begins to reach its limits and does not allow extended options. The biggest problem may be the total thickness of the device. Especially with two displays (and double sided printed wire board) more size is needed and the product is more expensive. Although practical, its big size does not agree to everyone's taste. Mechanism for two displays and a keyboard and a keypad, however does not make it very easy to decrease the size of the phone.

Prior attempts of foldable mobile terminal devices are described e.g. in the patent documents WO9819434, and WO0153919. From WO9819434 there is known a mobile electronic device (MED) comprising: a keyboard with an operative surface, a cover having at least one transparent area, and a display element having a display surface. The mobile phone described therein has a keyboard, located on a foldable cover with a transparent area, and is operable in the open and in the closed position. The display element incorporated in the body of the device is visible through a transparent area of the cover in the closed position, but it is just another example of the traditional clamshell construction that has been used for years. The device described in WO9819434 further has the drawback that the device can not be used on a desk in laptop fashion, because the display is incorporated in the body of the device so the device would tilt when opened and placed on a table.

In WO0153919 a convertible modular PDA is described. It has three parts but these parts are attached with hinges to the central part and by switching their positions, different modes are available. The device in this document needs at least two displays to provide the desired functionality.

SUMMARY OF THE INVENTION

It is desirable to improve foldable mobile electronic devices that are operable in a closed and in an open position.

It is desirable to have a thinner and more lightweight construction for a foldable mobile electronic device.

According to an embodiment of the present invention a mobile electronic device with a keyboard having an operative surface, a cover having at least one transparent area, and a display element having a display surface is provided. Said cover, said display and said keyboard are movably connected and articulated, respectively. The mobile electronic device comprises an open position wherein the display surface is located adjacent to said keyboard, said display surface and said keyboard being both (completely) visible and accessible. The mobile electronic device further comprises a closed position wherein said cover is covering said display element, and at least a part of said display surface is visible through said transparent area of said cover.

According to one embodiment of the present invention a way to achieve communicator look-a-like device with only one display element is provided which also gives extra benefits including smaller size. In this concept the mobile terminal comprises three parts: cover, display element and keyboard/engine. When opened, the display element moves away from the top of the keyboard and turns so that same display is in appropriate position for use with a keyboard. When closed, display is on top of the keyboard so that it is facing towards the cover. The cover can be made from transparent material and if the display is a touch screen, any kind of visual appearance can be achieved also when in closed position.

Conveniently, the keyboard, said cover, and said display element are connected by kinematic elements selected from the group of swivels, connecting rods, levers and/or slide tracks and slide rails. So different embodiments of the MED can be realised: a combination of connecting rods and slide tracks as depicted in the FIGS. 1 to 5. The MED may be embodied by a connecting rod-only embodiment, wherein said slide track is replaced by connecting rods. Even a slide track-only solution can be realised wherein compared to the device depicted in the figures the upper end of the display element is slideably connected to the cover, so that in the open position, a user can slide the display element from above the keyboard above the cover towards the inside of the clamshell. This may be embodied as a single slide track on the body and the cover, that can be used only with an open clamshell. It is even possible to use connecting rods from the swivel of the clamshell to the middle of the display element, both being pivotably attached and a combination of levers to achieve in the beginning an equiangular double clamshell opening of the cover, the display element and the body, and then a flip motion of the display element and finally an approach of the display element towards the cover. It may even be possible to control the opening and the closing of the device by means of servo components, wherein the movement can be controlled by servo control components.

Preferably, said display element is a touch screen display element having a touch screen surface. By using a touch screen display the electronic device can provide multiple advantages to a user. In the open position a touch screen can economise an input device to provide a cursor functionality. The user can simply touch the screen and does not have to interact with trackballs, touch pads and the like.

A touch screen display and a thin cover can reduce the thickness of the device distinctly. Also, when in the closed position, there is no need for a separate display and/or keys on top of the device. Everything can be done with a touch screen. This also enables several different modes when in the closed position. For example, the top of the electronic device can be used for gaming and all the surface could be used without restrictions. Also a structure for a sliding display is robust. Preferably, the cover itself is flippable without exposing the keyboard to provide an enhanced gaming operability or the like.

Preferably, said cover provides an operative surface. The operative surface can be provided by e.g. membrane buttons or the like.

Preferably, said operative surface of said cover is transferring user interaction with said cover to input sensitive areas of said touch screen display. This enables the manufacturer to build very flat and lightweight covers. The transfer functionality can be embodied as e.g. rubber buttons, or slideably attached transparent buttons, that may comprise a stop to prevent damage to the display.

Advantageously, said cover can make underlying objects visible by an opening. A simple opening in the cover enables an inexpensive cover design. Preferably, apertures in the cover can be used to provide a direct touch screen access to the user so that the cover can be made of one-piece rigid material, without the need for rubber buttons and the like. This comprises the advantages of customizable button texts, and the fact that openings are easy to clean.

Conveniently, said cover can be made visible through at least one transparent window portion. By using a transparent material the touch screen and the display can be protected from being damaged in the closed position. So the device is better protected against environmental conditions, such as force, pressure, dust, spray and the like Preferably, said operative surfaces of the MED and of said touch screen display element are operable in said open position. By operating the touch screen a user does not have to interact with trackballs, touch pads and the like, and the mobile electronic device provides additional user interactivity. Cursor input devices can be economised.

Advantageously, said cover is pivotably attached to said keyboard. A simple swivel is a robust and easy to implement connection providing an easy-to-understand operation to a user.

Preferably, said kinematic elements are attached to the keyboard, the display and the cover, so that said open position can be achieved by just moving or pivoting said cover from the closed to the open position. If the kinematic elements offer a fast and simple motion of the cover with an automated leaded motion of the display element, it can be prevented that a user damages the mobile electronic device (MED) by disregarding the sequence of motions to e.g. close the device, as may happen if the MED is embodied as a cover pivotably connected to the keyboard and a display element connected via e.g. slide tracks to both, wherein said device may fold up in a triangular fashion, wherein parts of the slide track connection may be damaged.

Advantageously, said MED further comprises a component to detect, if the mobile electronic device is in an open or in a closed position. This component can be a switch or the like operated when the device is opened or closed. This may be embodied as a contact or contact-less operated switch actuated by the kinematic elements in accordance with their position.

Conveniently said MED further comprises a component to operate said display according to said detected position. This is especially useful to switch from the display mode in the closed position to the display mode in the open position (cf. FIG. 3B).

Preferably, at least a part of said cover is detachably attached to said MED. By using detachable covers a MED according to this embodiment of the invention is freed from nearly all restrictions from standard clip on covers such as button- and display-size and arrangement and the like (cf. FIG. 6).

Just to give a slight idea of the plurality of possibilities provided by said concept the buttons can be arranged in a triangular, round or oval or any other fashion without any problems of implementation. Even a dial can be implemented without any problems, e.g. by just providing a ¾-circle shaped aperture and a displayed dial, the depicted dial can be animated which would be a nice retro style application, providing dialability without any mechanical parts.

Advantageously, the MED further comprises a component to operate said display according to said attached cover. So there is a feature provided to not only provide different covers but also the possibility to adapt the operation of the display and the touch screen to the design of the cover actually clipped on. Hence, the appearance and the operation of the mobile terminal device can be customised.

Preferably, the MED further comprises a switching component to activate or disable at least one of said operative surfaces. This component enables two different operative aspects, firstly e.g. a keyboard on the MED may be deactivated in the closed position to prevent small objects between the rear surface of the display element and the keyboard from inadvertently activating undesired functions in the closed state. This feature may be extended so that in the closed state the keys on the keyboard are pressed, to provide a smaller overall height of the MED. The switching component can be used to simply lock the input of the device e.g. when carried in a pocket.

Conveniently, said MED is a mobile communication device, a mobile computer device or the like. The MED can be a cell phone with additional features in the open position. The MED can be a PDA with additional features in the closed position, like palmtop computers and the like. The MED can be e.g. a digital versatile disc (DVD) or CD player with the positions to watch e.g. a film in the open and in the closed position, and providing e.g an electronic book feature in the closed position.

BRIEF DESCRIPTION OF THE DRAWINGS

In the following, the invention will be described in detail by referring to the enclosed drawings in which.

DETAILED DESCRIPTION

Figure 1:
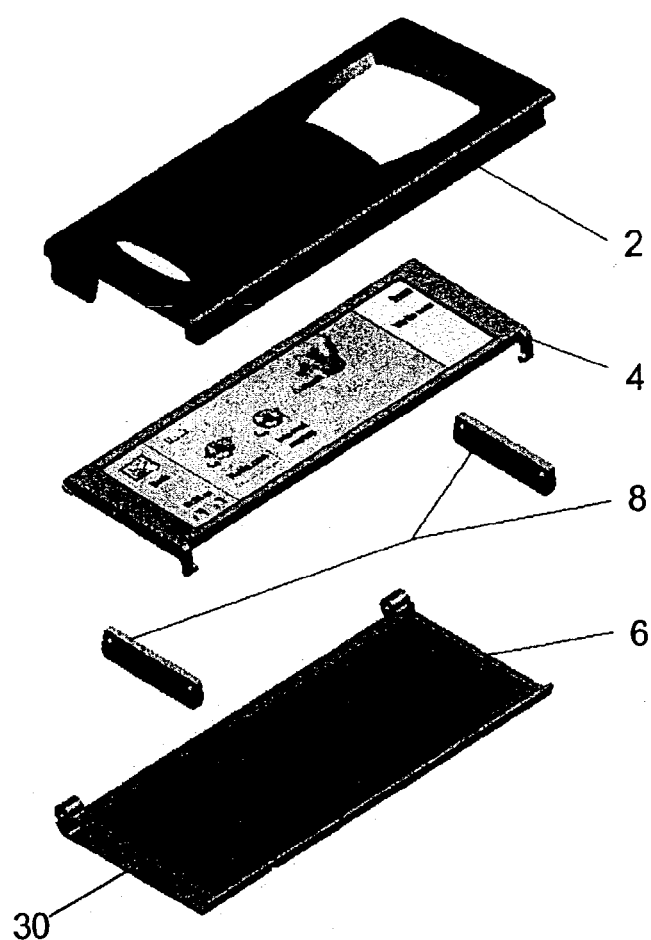
FIG. 1 is an exploded view of the main parts of a mobile electronic device according to one embodiment of the present invention.

FIG. 1 is an exploded view of the main elements of a mobile electronic device according to one embodiment of the present invention. The folding mechanism presented here enables the use of only one large PDA-display on the device which has two modes, phone and PDA mode. The electronic device comprises a cover 2, a display 4, and body 6, and two connecting rods 8. The body 6 can also be denoted as a keyboard or keyboard element.

Figure 2:
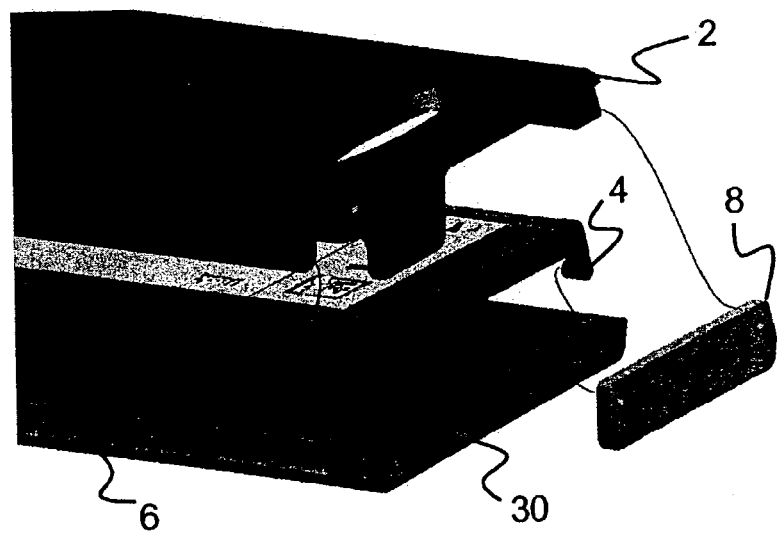
FIG. 2 depicts the physical connections between the parts of the electronic device of FIG. 1, FIGS. 3A to 3N illustrate the steps by which the folding mechanism of the device of figure works by moving the cover in 10 degrees steps.

FIG. 2 depicts the physical connections between the parts of the electronic device of FIG. 1. The mechanism contains two connecting rods 8 that are connected on one end to front cover 2 and on the other to display element 4, both ends are pivotably attached. The display element 4 and body 6 are connected with slide tracks 30 which enables axial rotation and movement along the slide tracks. The body 6 and front cover 2 are hinged together.

Figure 3A:
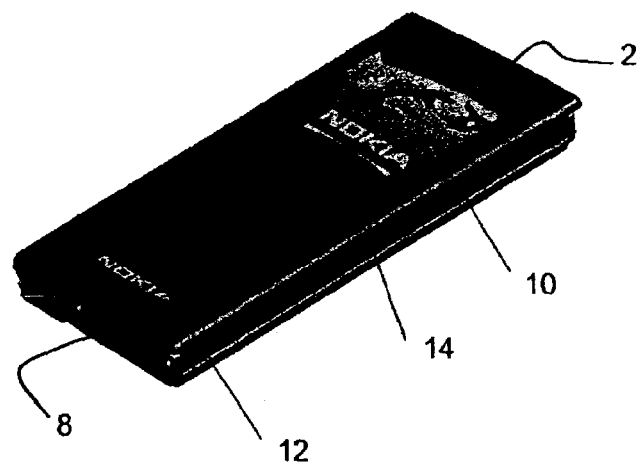
Figure 3B:
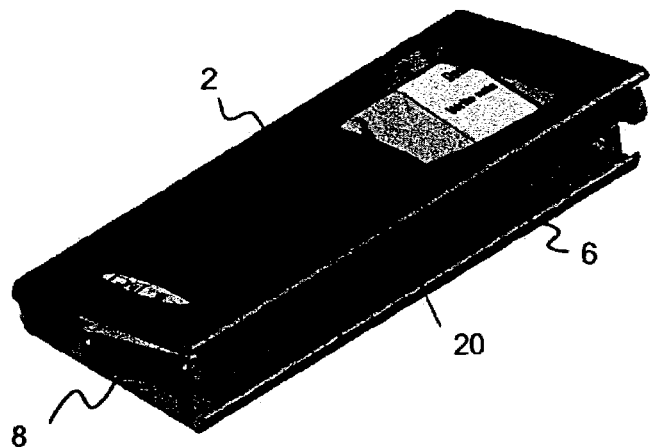
Figure 3C:
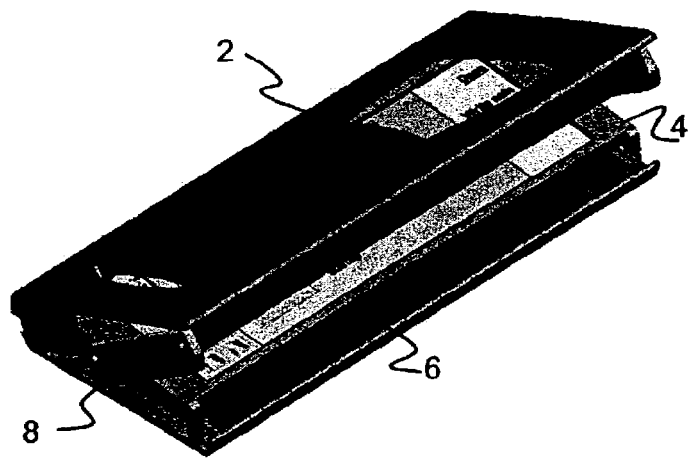
Figure 3D:
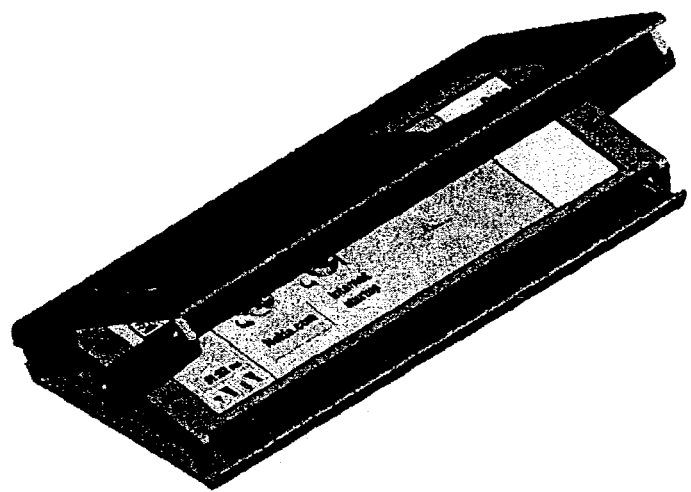
Figure 3E:
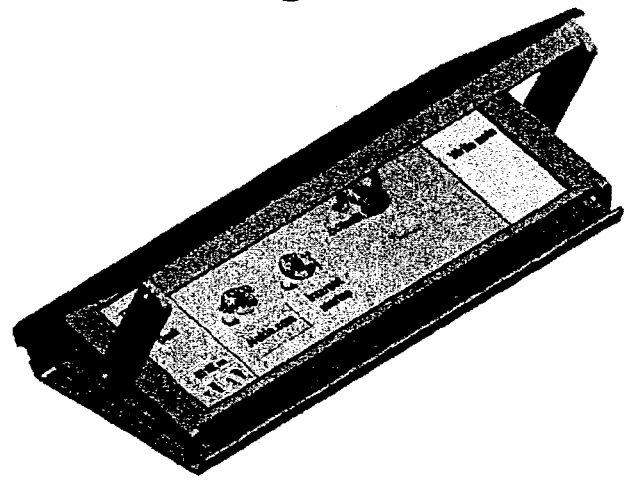
Figure 3F:
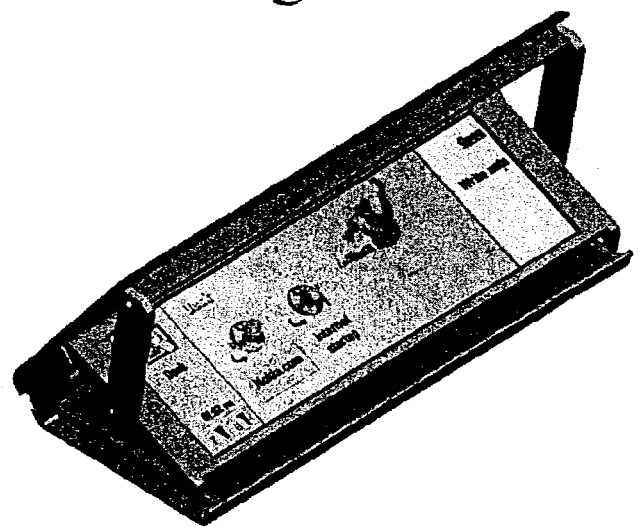
Figure 3G:
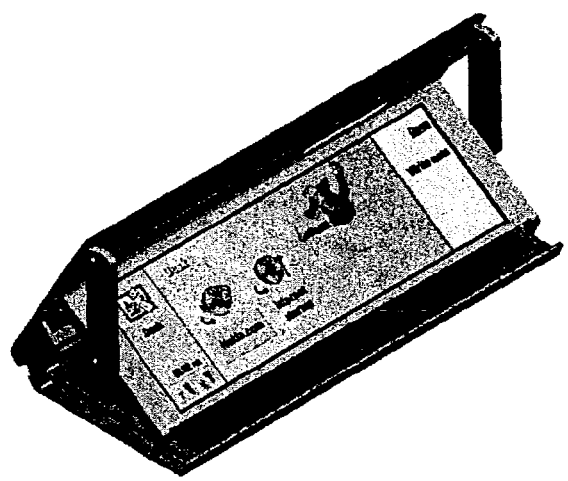
Figure 3H:
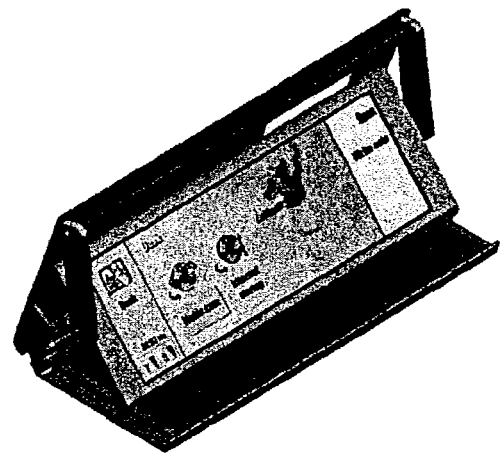
Figure 3I:
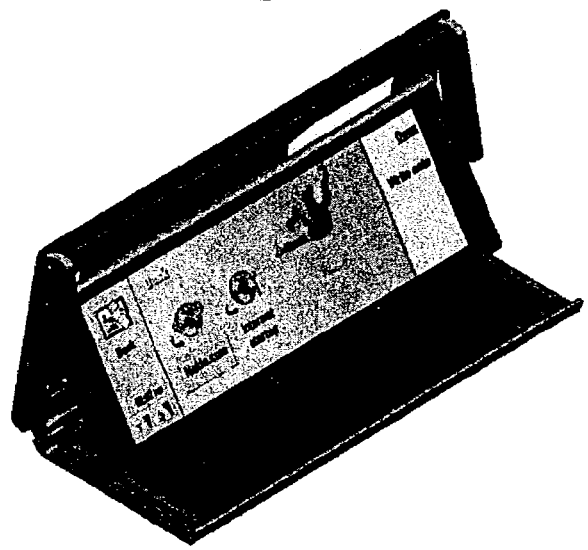
Figure 3J:
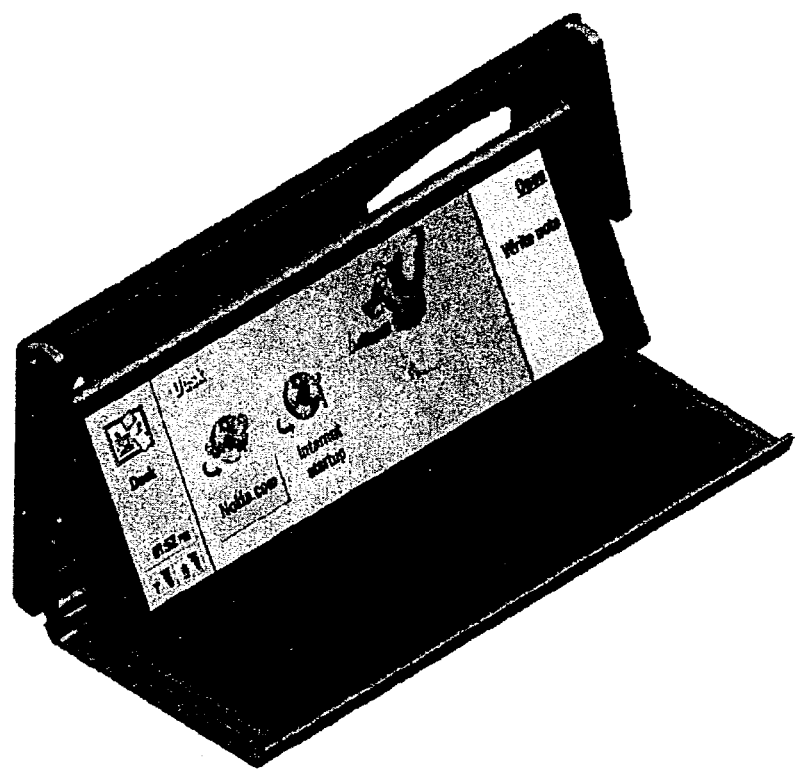
Figure 3K:
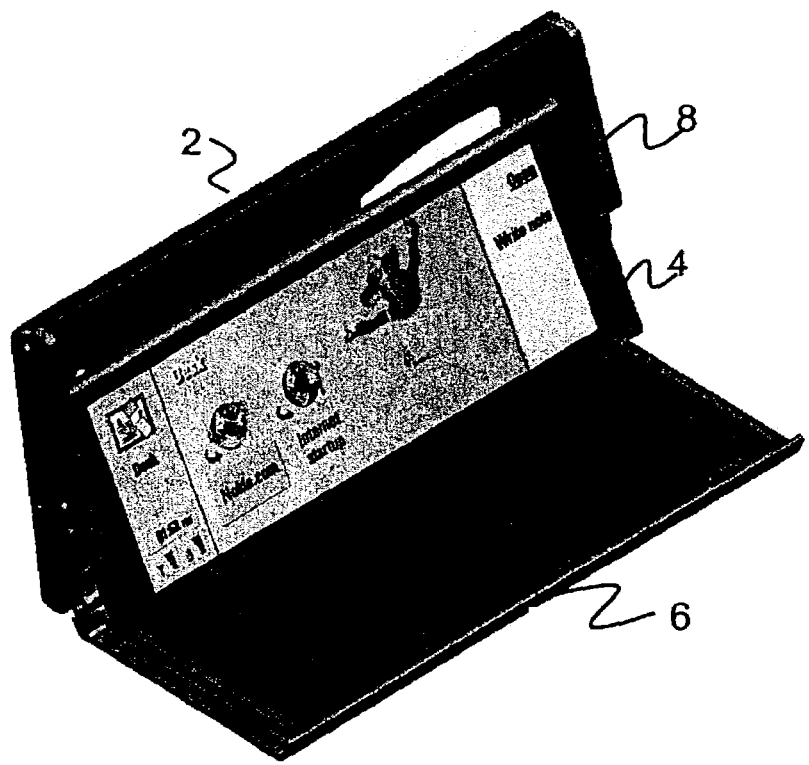
Figure 3L:
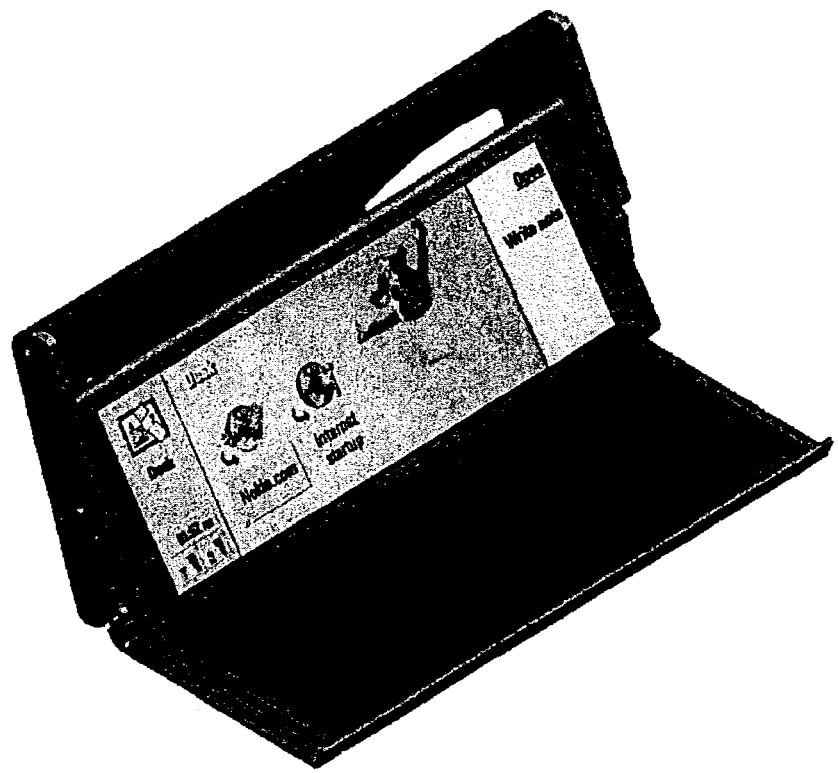
Figure 3M:
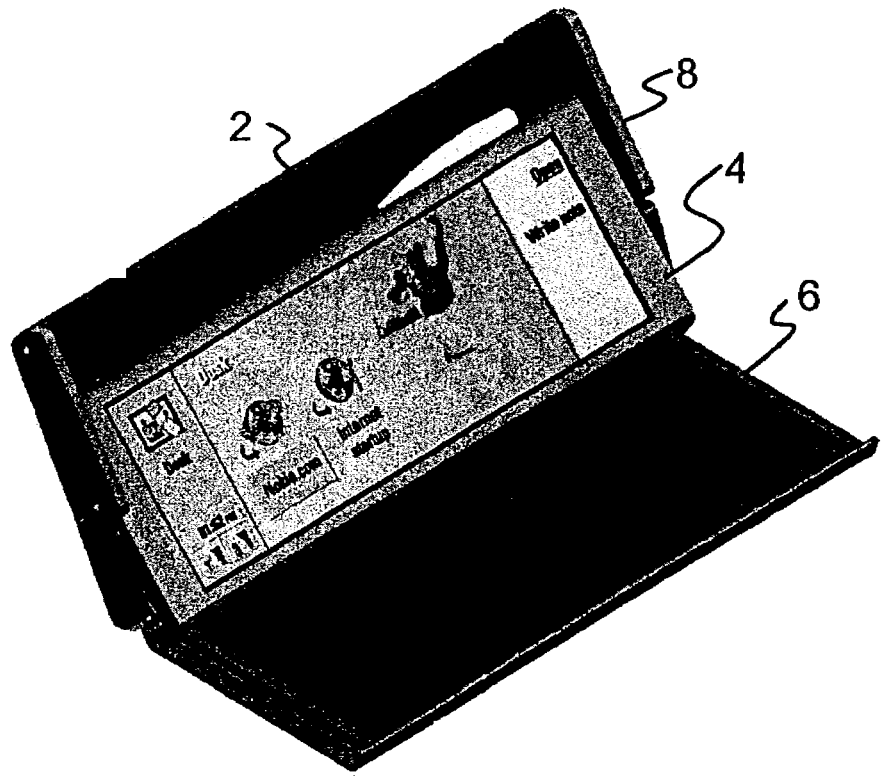
Figure 3N:
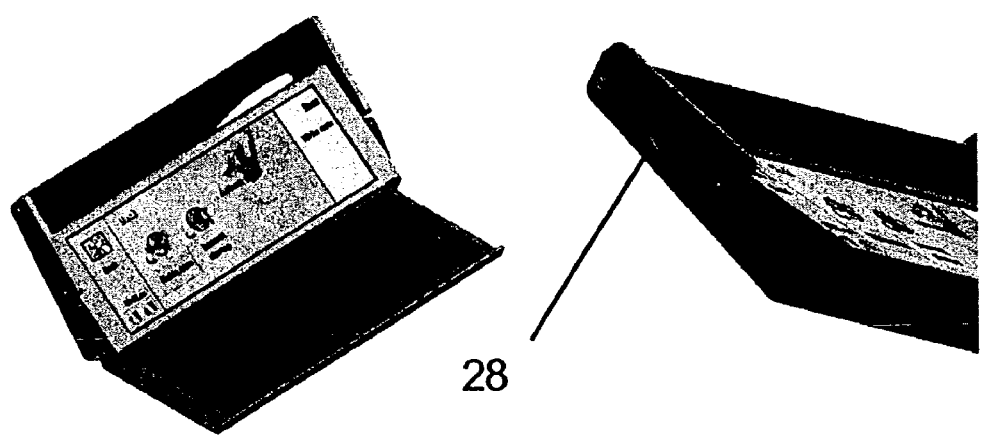

FIGS. 3A to 3N illustrate how the folding mechanism of the device works by moving the cover in 10 degree steps. FIG. 3A depicts assembled electronic device in the closed position. In the closed position the front operative surface of said body 6 is substantially conforming the rear surface of said display element 4 and said rear surface of said cover 2 is substantially conforming said display surface of said display element 4. The cover 2 has apertures 10,12 so that in the closed position, at least part of said front display surface of said display element 4 is visible through the apertures 10 and 12 of the cover 2. The apertures 10,12 enable a user to use the large display in the closed position. The cover 2 further has keys 14 so that in the closed position, at least a part of the front cover surface can be operated as in the case of a conventional handheld mobile telephone.

The keys 14 can be embodied as e.g. keys implemented in the cover, and connected to the body of the device e.g. by a flexible power connector. In the case that a touch screen display is used, the keys 14 can be embodied as elastomer or rubber keys transferring pressure applied to the keys to the touch screen display, economizing electric keys in the cover 2. The elastomer keys 14 can be provided with a stop to prevent damage of the touch screen display if overpressure is applied to the keys 14. If the elastomer keys 14 are provided with a transparent area, the device can provide a softkey functionality, by changing the lettering of the keys according to an actually available function. The number of keys 14 necessary to operate can be reduced to a minimum, if a softkey only cover is used. Using transparent elastomer keys 14 further has the advantage that active or expected inputs of keys to be pressed can be indicated e.g. by colour or animated illumination provided from the display. This feature can be helpful e.g. to accept an incoming phone call in the dark, if the device illuminates only the key to be pressed to accept the call.

The area of the display visible through the aperture 10 can be used to provide the standard functionality of e.g. a standard cellular phone display, such as reading SMS, MMS and the like. If the display is a colour personal digital assistant (PDA) display, so also the phone display will be in colour. The aperture 12 can be used to display flashing and scrolling illuminated coloured phone logos and texts can be placed on any area of front cover and varied with software updates. The logos can be SMS-logos, operator logos or manufacturer logos (see FIG. 3A). In the closed position the mobile electronic device is designed for one hand use so that the displayed text is substantially oriented parallel to the slide tracks 30 or the connecting rods 8 in the closed position When the front cover 2 is opened (FIG. 3B), a switch (not shown) first turns off the phone display texts and activates the horizontal PDA screen texts 20. During opening procedure the two connecting rods 8 control the display element 4 and align it to a different position.

The FIGS. 3C to 3M depict how the folding mechanism works during the opening of the device of by moving the cover 2 in 10 degrees steps.

The opening angle is restricted with a notch feature 28 on the side edge of display element 4 (FIG. 3N).

The closing movement is done vice versa.

Figure 4:
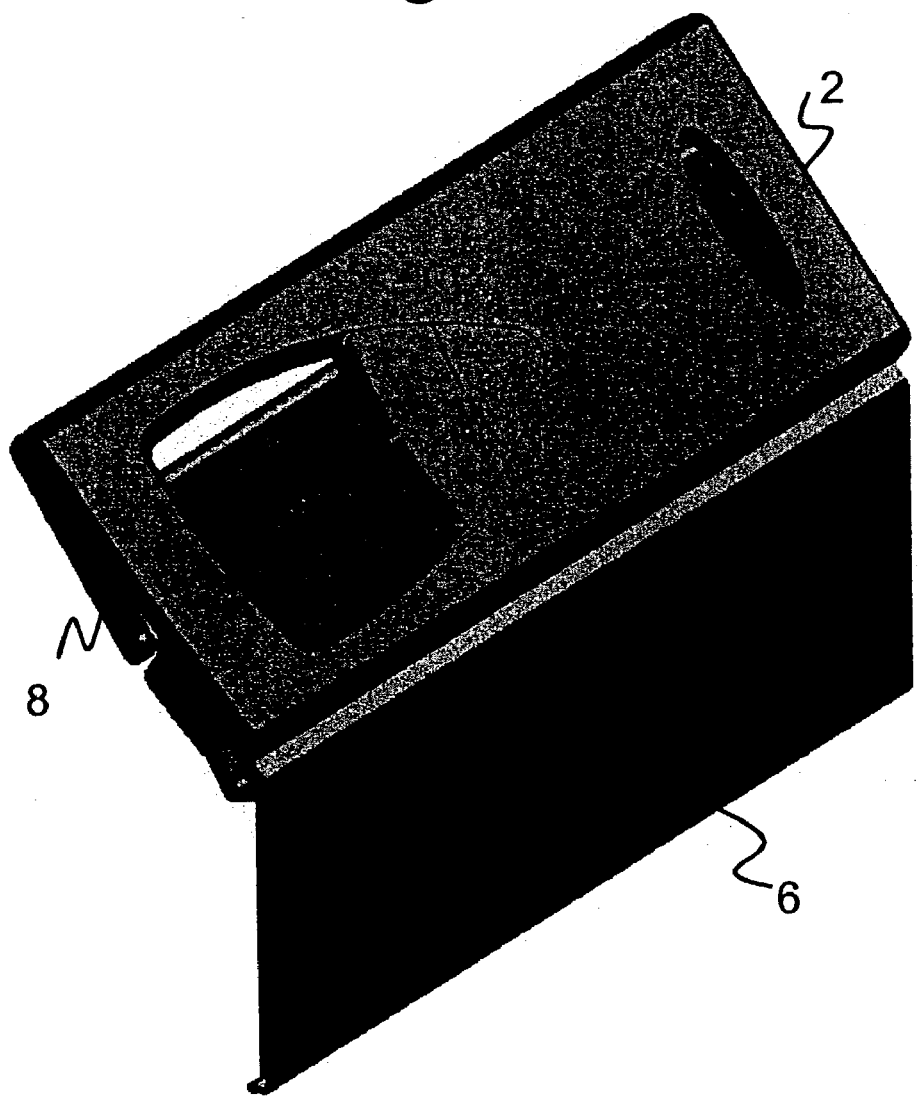
FIG. 4 is a back view of the device of FIG. 1 in the open position.

FIG. 4 is a back view of the device of FIG. 1 in the open position, with the rear surface of the display element 4 visible through the aperture in the cover 2.

Figure 5:
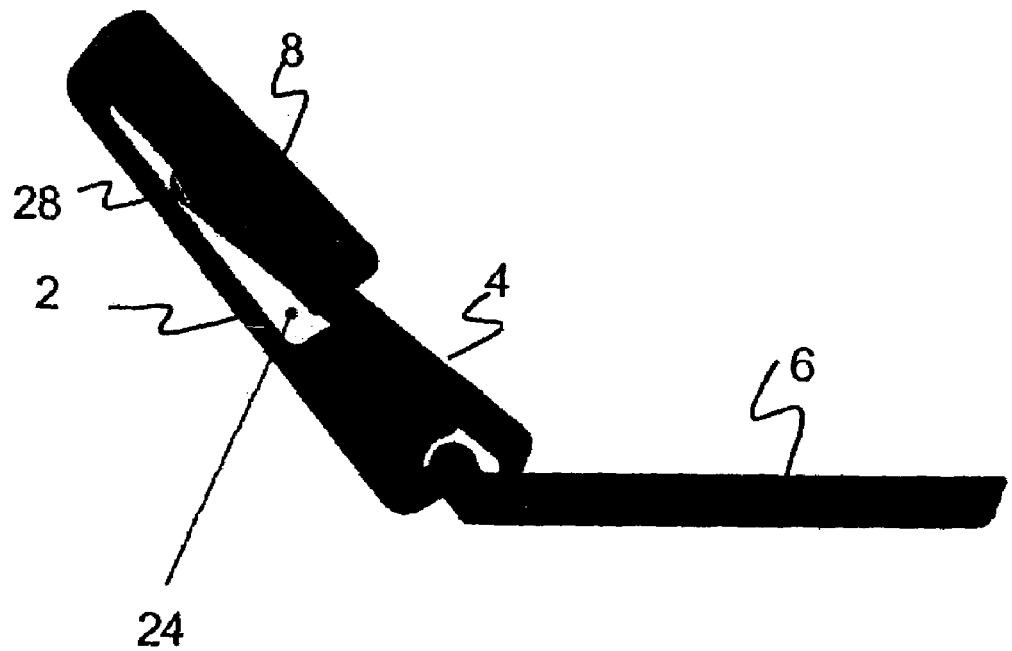
FIG. 5 is a side view of the device of FIG. 1 in the open position.

FIG. 5 is a side view of the device in the open position. Most likely the display element 4 is connected to the body 6 (where all hardware elements are integrated in) with flexible power connector (FPC) 24. As shown in FIG. 5 the FPC will always remain safe between front cover 2 and display element 4 or between the display element 4 and the body 6 during opening and closing.

Figure 6:
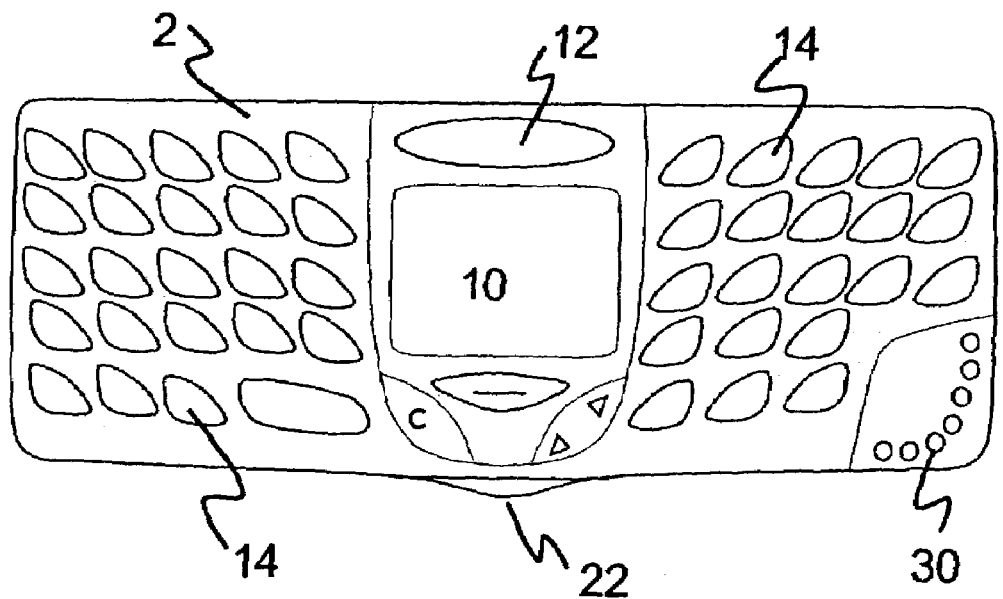
FIG. 6 depicts an embodiment of the mobile electronic device with an exchangeable cover according to another embodiment of the present invention.

FIG. 6 depicts an embodiment of another embodiment of a cover 2. The cover 2 of FIG. 6 is an exchange cover. If the exchange cover 2 comprises an exchangeable operative surface, or if the cover 2 is detachable and exchangeable, another advantage of the invention becomes apparent. The design of the exchange cover 2 is not restricted by conventional display and keyboards located under the surface of the exchange cover 2. The exchangeable cover 2 may comprise arbitrary apertures for providing any display sizes and orientations. As an example for this a cover design similar to the NOKTA® 5510 mobile telephone. To provide the complete hardware compatibility to any kind of cover-, key- and display design, a software download may be used to adapt the functionality to the embodiment of the respective cover.

In the figure, reference numeral 2 refers to the exchange cover element. The cover element 2 can be the whole cover, that may be exchangeable only by service stations, or can be a user exchangeable clip on cover. The cover 2 comprises a display aperture 10, and a logo aperture 12. One or both apertures may be covered with transparent material to provide an additional protection of the touch screen below. The whole cover can be made of transparent material, and may be painted or coated on the non display areas. The cover comprises buttons 14 that can be simple rubber elements that pass a pressure to the touch screen. The keys can be electrical elements connected to the body 6 by e.g. a FPC. The only technical requirement out of the ordinary is, that the keys themselves have to be thin, in order not to waste the height gained by the inventive design. Domes under a membrane are tested for a quite sufficiently thin implementation for the cover. The cover further has a built in loudspeaker 30 to provide the full telephone operability. The loudspeaker may be arranged on the rear side of the body 6, as the body 6 is the element of the electronic device with the biggest height, for simple implementation. Such an "upside down" design has the advantage that the whole cover can be completely with out any electrical connections. The cover 2 of FIG. 6 further comprises a catch 22, to lock the cover to the body in the closed position in a spectacle case fashion.

It is to be noted that a device according to the invention improves earlier solutions and has the following advantages:

It enables to use only one large display for the both modes, phone and PDA mode, and thereby economises a whole display element.

With colour PDA display, the phone display will be a colour display, too.

Flashing and scrolling illuminated coloured phone logos and texts can be placed on any area of front cover and varied with software, SMS-logos, operator logos, and manufacturer (see FIG. 3Aa)

Front cover rubber keys would be pressed against the large screen which would have touch screen feature The illumination of keys can be done with the illumination of display, and can be adapted to the actual functionality of the keys.

Enables simpler and cheaper design: Front cover would be only a protective plastic part on top of the display screen which would fold away from it when it is opened.

Enables smaller total thickness of device, as no second display, components, button domes etc. are required.

Results lower weight for the upper part so that the device would not tilt when opened and placed on a table.

Results in a lower total weight of the mobile electronic device.

An aspect of the invention lies in its three-part construction where the same display can be used in open and closed positions. A foldable display element that is in the middle between cover and keyboard and the way it moves is a feature of the invention when considering prior art.

A special folding mechanism is provided which enables the use of the same large display component on an electronic device such as a NOKIA® Communicator construction on both, phone and PDA, modes. This results in a thinner and more lightweight construction and brings new features and last but not least a "WOW" effect to the device.

This application contains the description of implementations and embodiments of the present invention with the help of examples. It will be appreciated by a person skilled in the art that the present invention is not restricted to details of the embodiments presented above, and that the invention can also be implemented in another form without deviating from the characteristics of the invention. The embodiments presented above should be considered illustrative, but not restricting. Thus the possibilities of implementing and using the invention are only restricted by the enclosed claims. Consequently, various options of implementing the invention as determined by the claims, including equivalent implementations, also belong to the scope of the invention.

What is claimed is:

1. A mobile electronic device comprising:
   a keyboard with an operative surface,
   a cover having at least one transparent area,
   a display element having a display surface,
   wherein said cover, said display element and said keyboard are each movably connected to each other such that said keyboard is movably connected to at least said cover and said display element, said cover is movably connected to at least said keyboard and said display element, and said display element is movably connected to at least said keyboard and said cover so as to define an open position, wherein the display surface is located adjacent to said keyboard, said display surface and said keyboard are both visible and accessible in said open position;
   and a closed position, wherein said cover is covering said display element and said display element is on top of the said keyboard, so that the display surface is facing towards said cover, at least a part of said display surface being visible through said transparent area of said cover in said closed position.

2. A mobile electronic device according to claim 1, wherein said cover, said display element and said keyboard are connected by kinematic elements selected from the group of swivels, connecting rods, levers and/or slide tracks and slide rails.

3. A mobile electronic device according to claim 2, wherein said kinematic elements are attached to said keyboard, said display element and said cover, in such a way that said open position can be achieved upon pivoting said cover from the closed to the open position.

4. A mobile electronic device according to claim 1, wherein said display element has a touch screen display surface.

5. A mobile electronic device according to claim 4, wherein in said open position, both said operative surface of said mobile electronic device and said touch screen display surface are operable.

6. A mobile electronic device according to claim 1, wherein said cover provides an operative cover surface.

7. A mobile electronic device according to claim 6, wherein said operative cover surface is operated by transferring user interaction with said cover to input sensitive areas of said touch screen display surface.

8. A mobile electronic device according to claim 1, wherein said transparent area of the cover is an opening.

9. A mobile electronic device according to claim 8, wherein said opening is covered with transparent material.

10. A mobile electronic device according to claim 1, wherein said cover is pivotably attached to said keyboard.

11. A mobile electronic device according to claim 1, further comprising a component to detect if the mobile electronic device is in said open or in said closed position.

12. A mobile electronic device according to claim 11, further comprising a component to operate said display element in accordance with said detected position.

13. A mobile electronic device according to claim 1, wherein at least a part of said cover is movably attached to said display element.

14. A mobile electronic device according to claim 13, further comprising a component to operate said display element in accordance with said cover being attached or being detached from the mobile electronic device.

15. A mobile electronic device according to claim 1, wherein the keyboard has more than one operative surface and further comprising switching means to activate or disable at least one of said operative surfaces.

16. A mobile electronic device according to claim 1, wherein said mobile electronic device is a mobile communication device, a mobile computer device or media player.

17. An apparatus comprising:
   a keyboard means,
   a cover means having at least one transparent area,
   display, means having a display surface,
   means for movably connecting said keyboard means, cover means and display means so that each of said keyboard means, cover means and display means is movably connected to each other such that said keyboard means is movably connected to at least said cover means and said display means, said cover means is movably connected to at least said keyboard means and said display means, and said display means is movably connected to at least said keyboard means and said cover means so as to define an open position, wherein the display surface is located adjacent to said keyboard means, said display surface and said keyboard means are both visible and accessible in said open position, and a closed position, wherein said cover is covering said display means and said display element means is on top of the said keyboard means, so that the display surface is facing towards said cover means, at least a part of said display surface being visible through said transparent area of said cover means in said closed position.

18. The apparatus according to claim 17, wherein said cover means, said display means and said keyboard means are connected by kinematic elements selected from the group of swivels, connecting rods, levers and/or slide tracks and slide rails.

19. The apparatus of claim 18, wherein said kinematic elements are attached to said keyboard means, said display means and said cover means, in such a way that said open position can be achieved upon pivoting said cover means from the closed to the open position.

20. The apparatus according to claim 17, wherein said keyboard means has more than one operative surface and further comprising means for activating or disabling at least one of said operative surfaces.

* * * * *

UNITED STATES PATENT AND TRADEMARK OFFICE
CERTIFICATE OF CORRECTION

| | |
|---|---|
| PATENT NO. | : 7,197,346 B2 |
| APPLICATION NO. | : 10/395016 |
| DATED | : March 27, 2007 |
| INVENTOR(S) | : Eromäki et al. |

It is certified that error appears in the above-identified patent and that said Letters Patent is hereby corrected as shown below:

In column 8, line 53, claim 17, line 4 after "display" "," should be deleted.

Signed and Sealed this

Seventeenth Day of June, 2008

JON W. DUDAS
*Director of the United States Patent and Trademark Office*